(No Model.)

M. N. WEATHERS.
ROTARY OVEN GRATE.

No. 567,179.  Patented Sept. 8, 1896.

Witnesses
W. J. Koerth
V. B. Hillyard

Inventor
Manley N. Weathers

By his Attorneys,
C. A. Snow & Co.

UNITED STATES PATENT OFFICE.

MANLEY NEWTON WEATHERS, OF BERWICK, CANADA.

ROTARY OVEN-GRATE.

SPECIFICATION forming part of Letters Patent No. 567,179, dated September 8, 1896.

Application filed July 29, 1895. Serial No. 557,432. (No model.)

*To all whom it may concern:*

Be it known that I, MANLEY NEWTON WEATHERS, a citizen of Canada, residing at Berwick, in the county of Kings and Province of Nova Scotia, Canada, have invented a new and useful Rotary Oven-Grate, of which the following is a specification.

This invention relates to rotary grates to be used in connection with ovens of stoves and ranges, and aims to provide a device which can be placed in an oven without boring, drilling, or otherwise changing the same to receive the grate, and which will present a flat top, thereby enabling the full capacity of the oven-bottom to be used.

A further purpose of the invention is the provision of a grate which will lie close to the oven-plate, thereby enabling the bake-pan or other utensil to receive the full benefit of the heat radiated from the oven-bottom, and which will not be impaired in its effectiveness by the boiling or cooking over of fruit-juices, puddings, cakes, &c., as ample provision is had to allow for these occurrences.

The improvement consists of a rest formed of crossed bars beveled on their upper corners and having a vertical journal at their point of crossing, a revolving grate having a flat top and having a centrally-disposed tubular bearing, and a bearing-rib pendent from its lower side, the said bearing-rib being of a depth corresponding to the depth of the tubular bearing and located near the periphery of the grate, all as will appear more fully hereinafter, finally embodied in the claim, and shown in the accompanying drawings, in which—

Figure 1:
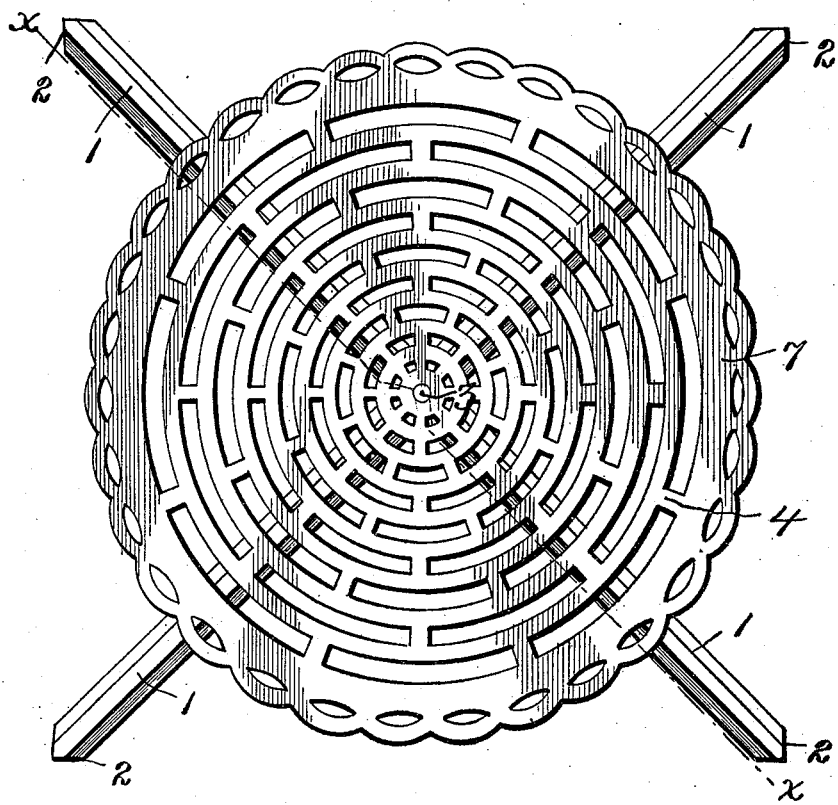
Figure 2:
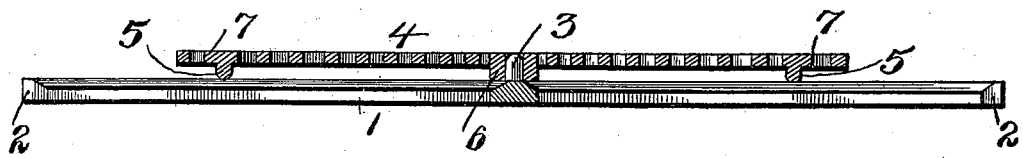

Figure 1 is a top plan view of an oven-grate constructed in accordance with this invention. Fig. 2 is a section thereof on the line X X of Fig. 1.

The rest is composed of crossed bars 1, which are beveled in opposite directions at their upper corners. The extremities of these bars are oppositely inclined, as shown at 2, so as to fit snugly in the angles formed between the adjacent sides of the oven. A journal 3 rises vertically from the rest at the point of crossing of the bars and centralizes the grate 4 upon the rest and prevents sidewise displacement thereof. The bars and the journal are integrally cast, although in some instances the bars may be welded together at the point of crossing and the journal be a separate part and secured in place during the operation of welding the bars, or by any other means. By beveling the upper corners of the bars a narrow surface is presented for the supporting-rib 5 of the grate to rest upon and for the fruit-juices and other food boiling or cooking over to lodge upon, and the beveled edges serve to direct the juices and food cooking over onto the oven-bottom. These bars are of uniform height or thickness, so that the grate, which is likewise of uniform thickness, may be supported thereby at its center and near its peripheral edge to admit of the bake-pan or utensil extending parallel with the oven-bottom, upon which the rest is placed, whereby the baking or cooking is accomplished in a satisfactory manner.

The grate 4 is circular in outline and is of suitable open or fret work to provide for the free circulation of the heated air, and a tubular bearing 6 projects from its under side and is of a depth corresponding to the depth of the supporting-rib 5, located near the outer edge of the grate. In assembling the parts the tubular bearing 6 receives the journal 3, and the latter forms a pivot or axis for the grate to revolve about. The outer edge portion of the grate is widened, as shown at 7, and the bearing-rib 5 is located thereunder and is protected thereby from the food boiling or cooking over.

The rest when placed in the oven has its crossed bars extending diagonally, thereby enabling the extremities of the said bars to fit snugly in the corners of the oven, and by means of which the device is prevented from moving about when it is required to apply force for rotating the grate to change the relative position of the food to be cooked, which is common in the culinary art. By having the top of the grate perfectly flat the full range and capacity of the oven can be utilized, and this would not be the case if the said grate were supplied with a vertically-extending rim as found in some devices of this character. From what has been said it will be understood that the rest is constructed so as to interpose a minimum amount of resistance between the bottom of the oven and the grate to the passage of the heat and fixes the position of the grate, so that it will be prevented from coming in contact with the walls of the oven, the arms formed by the crossing bars comprising the grate-rest having their ends formed with oppositely-inclined faces, so as to snugly fit the corners of the oven, and projecting a short distance beyond a straight line tangential to the grate and intersecting with the end portions of adjacent arms at equal distances from the point of crossing of the said bars.

It is contemplated to provide the invention in different sizes and to vary the style and pattern of the component parts, and in the adapting of the invention to a particular requirement it is to be understood that various changes in the form, proportion, and the minor details of construction may be resorted to without departing from the principle or sacrificing any of the advantages of this invention.

Having thus described the invention, what is claimed as new is—

An improved article of manufacture, a circular grate having a centrally-disposed pendent tubular bearing, and a pendent annular rib near its peripheral edge, and a grate-rest having a central journal and composed of bars crossing each other at right angles, forming arms whose ends have oppositely-inclined faces to snugly fit the corners of an oven, and which arms extend a short distance beyond a straight line tangential to the grate and intersecting with adjacent arms at equal distances from the point of crossing of the bars, substantially as set forth for the purpose described.

In testimony that I claim the foregoing as my own I have hereto affixed my signature in the presence of two witnesses.

MANLEY NEWTON WEATHERS.

Witnesses:
    E. B. COGSWELL,
    E. T. WITHERS.